United States Patent
Jain et al.

(10) Patent No.: US 10,497,158 B2
(45) Date of Patent: Dec. 3, 2019

(54) ALIGNING OBJECTS WITH TEXT

(71) Applicant: ADOBE INC., San Jose, CA (US)

(72) Inventors: Gaurav Jain, Noida (IN); Praveen Kumar Dhanuka, Howrah (IN)

(73) Assignee: ADOBE INC., San Jose, CA (US)

( * ) Notice: Subject to any disclaimer, the term of this patent is extended or adjusted under 35 U.S.C. 154(b) by 19 days.

(21) Appl. No.: 15/448,826

(22) Filed: Mar. 3, 2017

(65) Prior Publication Data

US 2018/0253878 A1    Sep. 6, 2018

(51) Int. Cl.
| | | |
|---|---|---|
| *G06F 17/21* | (2006.01) | |
| *G06F 3/0484* | (2013.01) | |
| *G06F 3/0482* | (2013.01) | |
| *G06T 11/60* | (2006.01) | |
| *G06T 11/20* | (2006.01) | |

(52) U.S. Cl.
CPC ............ *G06T 11/60* (2013.01); *G06F 3/0482* (2013.01); *G06F 3/04845* (2013.01); *G06F 17/214* (2013.01); *G06T 11/203* (2013.01); *G06T 2200/24* (2013.01)

(58) Field of Classification Search
CPC .... G06F 17/211; G06F 3/0482; G06F 17/214; G06F 3/04845; G06T 11/60; G06T 11/203; G06T 2200/24
See application file for complete search history.

(56) References Cited

U.S. PATENT DOCUMENTS

| | | | | |
|---|---|---|---|---|
| 5,943,063 | A * | 8/1999 | Dowling | G09G 5/28 345/428 |
| 6,426,751 | B1 * | 7/2002 | Patel | G06F 17/214 345/468 |
| 7,370,269 | B1 * | 5/2008 | Prabhu | G06F 17/30873 715/201 |
| 9,824,070 | B1 * | 11/2017 | SP | G06F 17/21 |
| 2004/0205542 | A1 * | 10/2004 | Bargeron | G06F 17/241 715/201 |
| 2007/0061704 | A1 * | 3/2007 | Simova | G06F 17/2247 715/210 |
| 2008/0104509 | A1 * | 5/2008 | Walker | G06T 11/60 715/276 |
| 2009/0063946 | A1 * | 3/2009 | Balasubramanian | G06F 17/2229 715/205 |

(Continued)

OTHER PUBLICATIONS

Cruise, Working with Typography and Tables in Adobe InDesign CS4, By Adobe Press_Dec. 31, 2008 (Year: 2008).*

(Continued)

*Primary Examiner* — Stephen S Hong
*Assistant Examiner* — Ahamed I Nazar
(74) *Attorney, Agent, or Firm* — Shook, Hardy & Bacon LLP

(57) ABSTRACT

An alignment engine facilitates aligning an object with a text segment, while maintaining the text segment as editable, in a graphics application. The text segment includes glyphs, which are graphical representations of characters. Each glyph is defined internally in the form of path information, which includes one or more points corresponding to the outline of the glyph. The path information for the text segment is determined and utilized in order to facilitate the alignment of an object with the text segment. The text remains editable subsequent to such alignment.

20 Claims, 9 Drawing Sheets

(56) References Cited

U.S. PATENT DOCUMENTS

| | | | | |
|---|---|---|---|---|
| 2013/0124967 A1* | 5/2013 | Hatfield | .................. | H04L 51/16 |
| | | | | 715/232 |
| 2014/0115452 A1* | 4/2014 | Rudolph | ............... | G06F 17/214 |
| | | | | 715/256 |
| 2014/0320527 A1* | 10/2014 | Cohen | ....................... | G06T 1/60 |
| | | | | 345/629 |
| 2015/0026618 A1* | 1/2015 | Stone | .................... | G06F 3/0486 |
| | | | | 715/769 |
| 2015/0220504 A1* | 8/2015 | Bocanegra Alvarez | ..................... | |
| | | | | G06F 17/241 |
| | | | | 715/233 |

OTHER PUBLICATIONS

Kontakt "How to Create a Simple Typographic Poster Design", published Nov. 2015, pp. 1-25. (Year: 2015).*

* cited by examiner

ALIGNING OBJECTS WITH TEXT

BACKGROUND

Computer graphics applications enable users to design a variety of graphics, such as logos, icons, marketing materials, and charts, for many different types of media. Such graphics often include text, as well as other objects and content. Sometimes, a user needs to precisely align an object with a segment of text in order to create a particular design. After such alignment, a user may wish to edit the text. However, currently available technology does not allow users to precisely align an object with text, while maintaining the text as editable.

SUMMARY

Embodiments hereof relate to, among other things, facilitating the alignment of an object with a text segment (or "snapping" an object to a text segment), while maintaining the text segment as editable, in a graphics application. The text segment includes glyphs, which are graphical representations of characters. Typically, each glyph is defined internally in the form of path information, which includes one or more points corresponding to the outline of the glyph. In order to facilitate snapping an object to a text segment, the path information for a glyph included in the text segment is determined. The object can then be snapped to the glyph. If the text segment is modified, the object remains snapped to the glyph subsequent to such modification. Accordingly, the object is precisely aligned with a text segment, while the text segment remains editable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the disclosure are described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 2A:
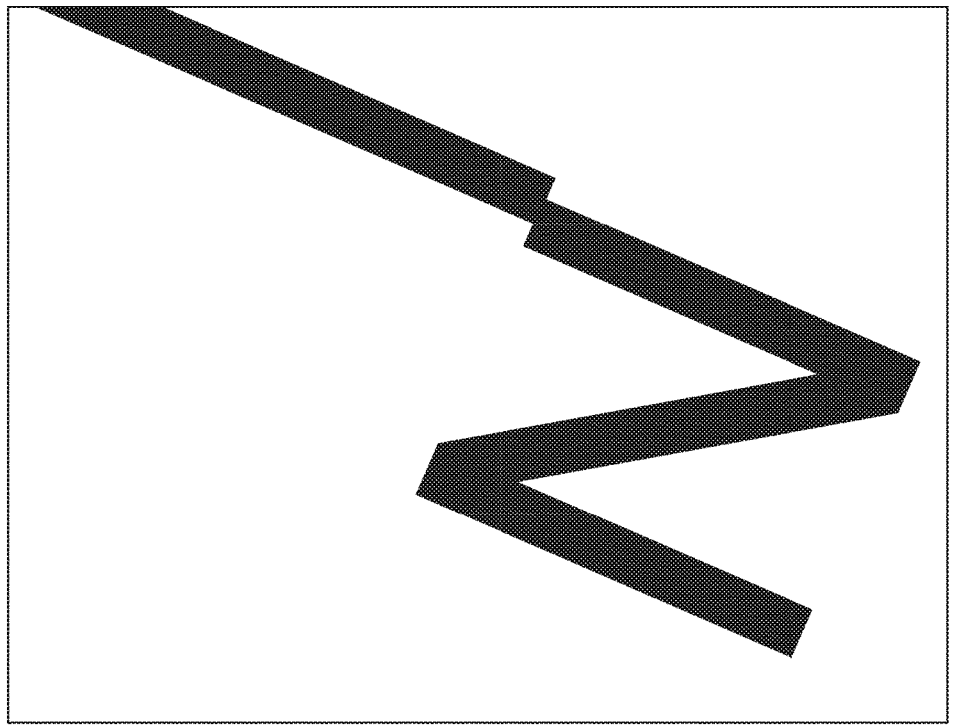
FIGS. 2A-B are exemplary graphical designs that include both text and objects, in accordance with some implementations of the present disclosure.

Computer graphics applications, such as Adobe Illustrator®, enable users to design a variety of graphics, such as logos, icons, marketing materials, and charts, for many different types of media. Such graphics often include text, as well as other objects and content. Sometimes, users need to precisely align an object with a segment of text. For example, as shown in FIG. 2A, an arrow has been aligned with a portion of the letter "U," and elongated lines have been aligned with portions of the letters "N" and "H." When an object is precisely aligned in this manner, it is described as being "snapped" to the text.

Figure 2B:
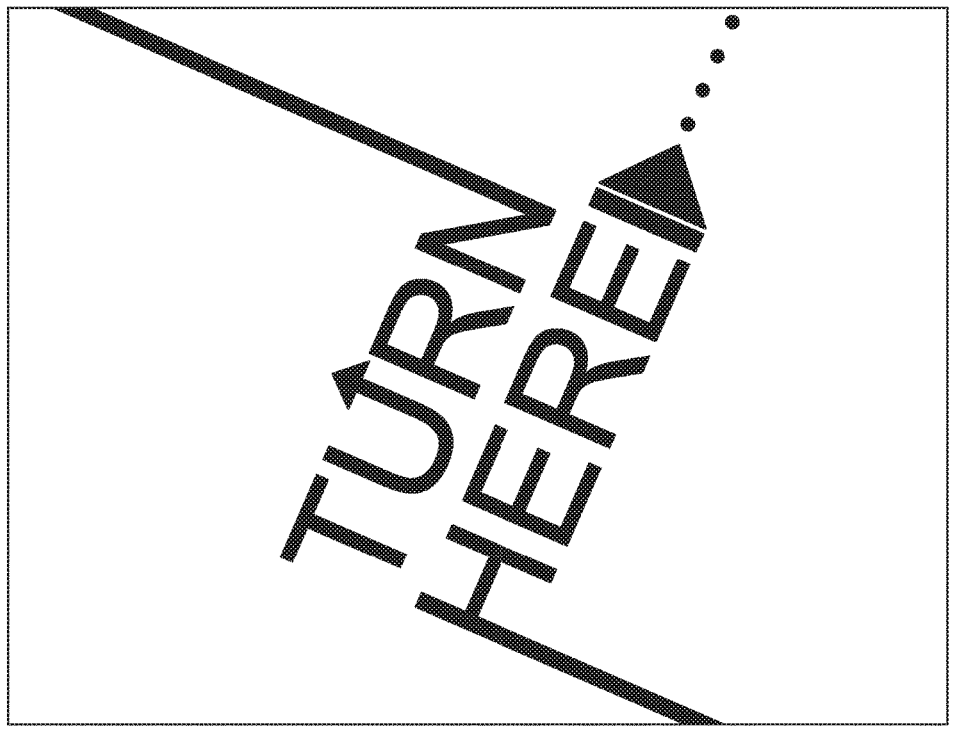

The presently available options for precisely aligning an object with text are unsatisfactory. One option is to manually position the object near the text. For example, a user might attempt to draw the object in the desired location. However, this approach is prone to errors. For example, if a user attempts to manually draw and align the elongated lines shown in FIG. 2A, the user is unlikely to precisely align the elongated line with the relevant portions of the text. Instead, the object is likely to be slightly offset from the text, as shown in FIG. 2B. This offset is visible upon zooming in on the graphic or when the graphic is rendered in a large format (e.g., in a large poster).

Figure 3A:
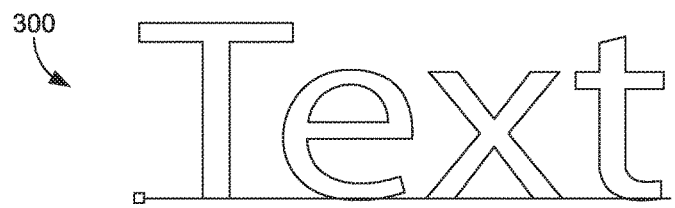
FIGS. 3A-B illustrate an exemplary conversion of text to an outline, in accordance with some implementations of the present disclosure.
Figure 3B:
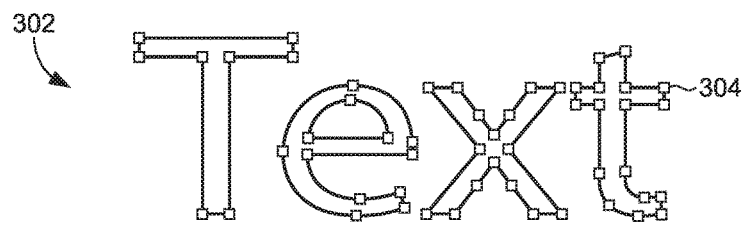

A second option that is presently available involves converting the text to an outline. For example, FIG. 3A depicts normal text art 300. In FIG. 3B, the text art 300 of FIG. 3A has been converted into an outline, resulting in path art 302. Upon converting the text to an outline, the path information for the text is exposed. The path information includes a series of anchor points (e.g., anchor point 304), to which new content may be snapped. This facilitates precisely aligning an object with text. However, when the text is converted to an outline, as in FIG. 3B, the text becomes vector art and can no longer be edited as text. For example, suppose a user converted the text "TURN HERE" of FIG. 2A to an outline in order to facilitate aligning the arrow and extended lines with the relevant portions of the text. But then suppose the user desired to change the capital letters "ERE"

in "HERE" to lowercase letters. This would not be possible, because the letters have been converted to vector art and are no longer editable as text. Thus, in order to produce the lowercase letters, the user would be required to type the desired text of "TURN Here," and then repeat the steps of converting the text to an outline and aligning the arrow and extended lines with the relevant portions of text.

Embodiments hereof address the technical challenge of facilitating the precise alignment of an object with text, while maintaining the text as editable. Specifically, the path information for a segment of text is exposed, thus allowing an object to be snapped to a particular anchor point and ensuring that the object is precisely aligned with the text (e.g., avoiding the error shown in FIG. 2B), but without converting the text to an outline. This is accomplished by gathering path information for a segment of text and providing the path information to a snapping module, which facilitates snapping content to the path. Because this functionality is provided without converting the text to an outline, the text remains editable as text even after an object is aligned with a portion of the text. For example, the characters in the text may be edited, the font of the text may be changed, or any other text-based modification may be made. This advantageously permits users to easily and quickly design graphics that include both text and other objects and content. Fewer user steps are required to create interesting designs involving text and other objects. Embodiments hereof provide new ways to create designs that include text and other objects, which are not possible via existing technology.

Figure 1:
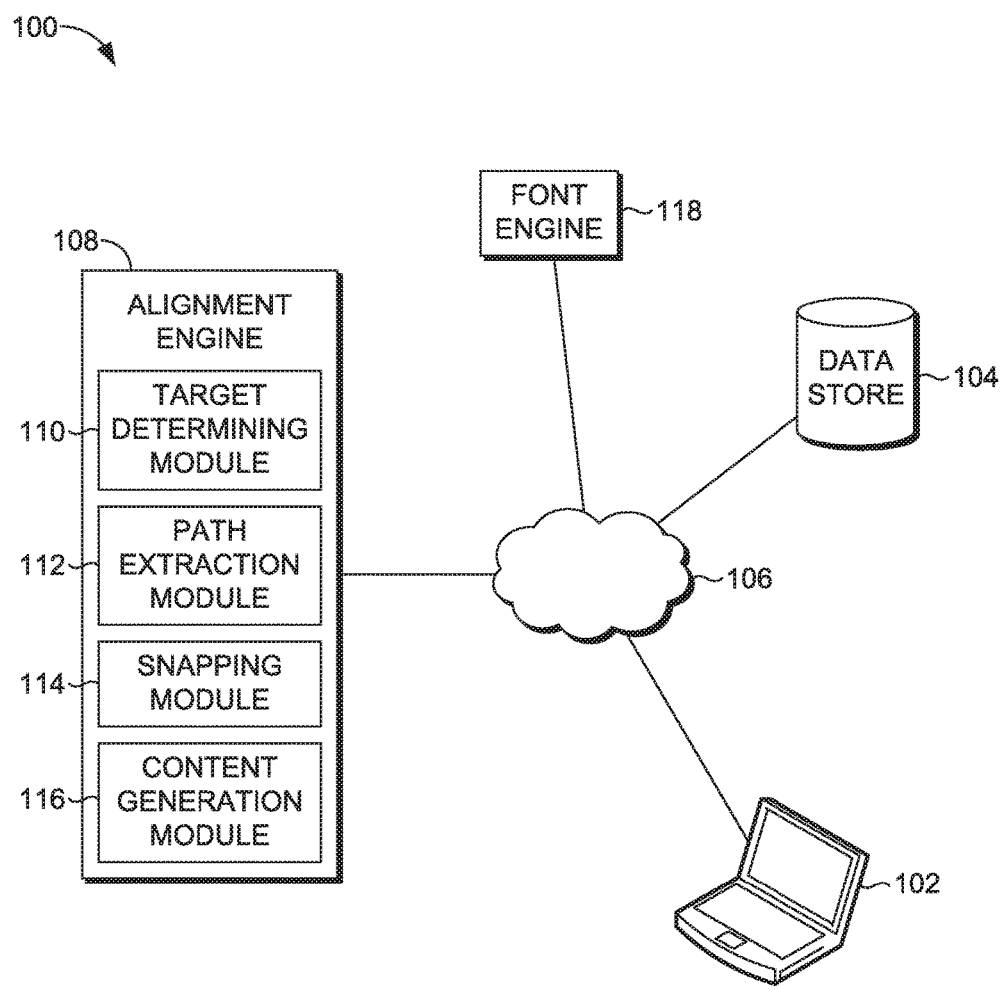
FIG. 1 is a block diagram illustrating an exemplary system for aligning an object with text, in accordance with some implementations of the present disclosure.

Turning now to FIG. 1, a block diagram illustrating an exemplary system 100 for facilitating the alignment of an object with text is provided, in accordance with implementations of the present disclosure. The system 100 is an example of a suitable architecture for implementing certain aspects of the present disclosure. Among other components not shown, the system 100 includes a user device 102 interacting with an alignment engine 108, a font engine 118, and a data store 104 to align an object with text, while maintaining the text as editable. Each of the components shown in FIG. 1 can be provided on one or more computer devices, such as the computing device 1200 of FIG. 12, discussed below. As shown in FIG. 1, the user device 102, the alignment engine 108, the font engine 118, and the data store 104 can communicate via the network 106, which may include, without limitation, one or more local area networks (LANs) and/or wide area networks (WANs). The network 106 may further include a cloud computing network, such as a public cloud, a private cloud, and/or a dedicated cloud. Such networking environments are commonplace in offices, enterprise-wide computer networks, intranets and the Internet.

In some embodiments, one or more of the illustrated components and/or modules may be implemented as stand-alone applications. In further embodiments, one or more of the illustrated components and/or modules may be implemented via a computing device, as an Internet-based service, and/or as a module within the alignment engine 108. It will be understood by those of ordinary skill in the art that the components and modules illustrated in FIG. 1 are exemplary in nature and in number and should not be construed as limiting. Any number of components and/or modules may be employed to achieve the functionality described herein. For example, any number of user devices, alignment engines, font engines, and data stores may be employed within the system 100 within the scope of the present invention. Each may comprise a single device or multiple devices cooperating in a distributed environment. In some instances, the alignment engine 108, font engine 118, and/or data store 104 may reside locally on the user device 102. Other components not shown may also be included within the network environment.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the computing system 100, may be carried out by a processor executing instructions stored in memory.

Figure 7:
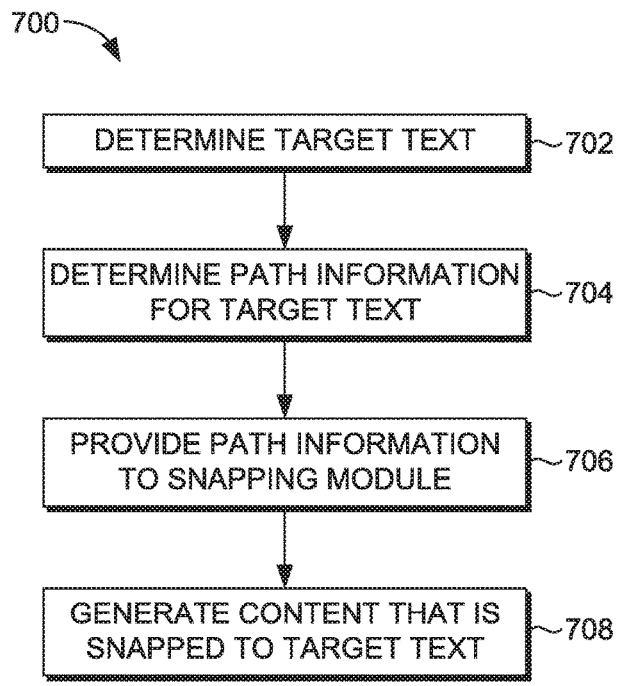
FIG. 7 is a flow diagram showing an overall method for aligning an object with text, in accordance with some implementations of the present disclosure.

The alignment engine 108 includes several modules that facilitate aligning an object with text. Each of these modules is discussed in detail below, but a high-level overview is provided here, with reference to FIG. 7, which illustrates an exemplary flow diagram 700 that includes steps for aligning an object with text. At step 702, the target determining module 110 determines the target text for which snapping functionality is to be enabled. The target text may include an entire segment of text, a single character within a text segment, or any other portion of text. At step 704, the path extraction module 112 determines the path information for the target text. As previously explained, the path information includes a series of points (e.g., control points or anchor points) corresponding to the outline of the target text. At step 706, the path information for the target text is provided to the snapping module 114. The snapping module may correspond to an existing module in a vector application (e.g., Adobe Illustrator®) or to a new module, which receives path information and facilitates snapping content to that path. Accordingly, when the path information for the target text is provided to the snapping module 114, the snapping module 114 facilitates snapping content to the target text. The path information for the target text may be stored in data store 104. At step 708, the content generation module 116 generates the content that is to be snapped to the target text. For example, the content generation module 116 provides drawing tools that are employed by a user to create different vector operations. Such tools include a cursor, pencil tool, pen tool, paintbrush tool, rectangle tool, and others.

Figure 8:
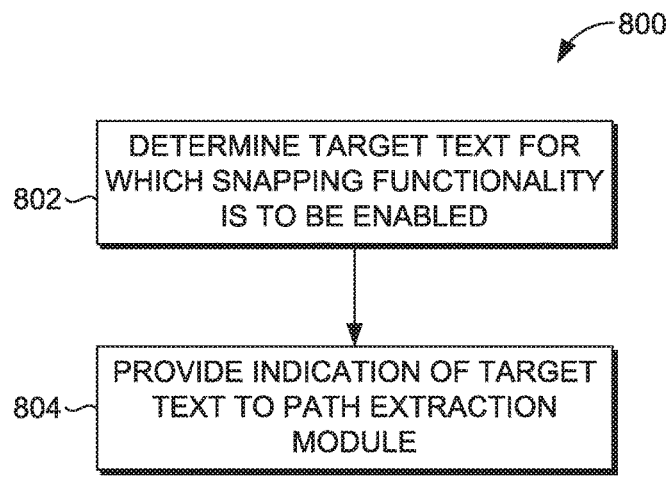
FIG. 8 is a flow diagram showing a method for determining target text for which snapping functionality is to be enabled, in accordance with some implementations of the present disclosure.

A more detailed discussion of the individual modules depicted in FIG. 1 will now be provided, beginning with the target determining module 110. The functionality provided by the target determining module 110 is discussed with reference to FIG. 8, which includes an exemplary flow diagram 800. The target text for which the snapping functionality is to be enabled is determined by the target determining module 110 at step 802 based on a variety of factors. In one example, the target determining module 110 receives an indication of a user input that corresponds to utilizing a drawing tool to hover over an art object. In response to such input, the target determining module 110 first determines whether the art object is text. If it is, the target determining module 110 determines that the art object over which the user is hovering is the target text for which the snapping functionality is to be enabled. If the art object is not text, the target determining module 110 determines that no snapping functionality is to be enabled at the present time. In another example, a user may select a menu command indicating that snapping functionality is to be enabled for certain target text.

Figure 4:
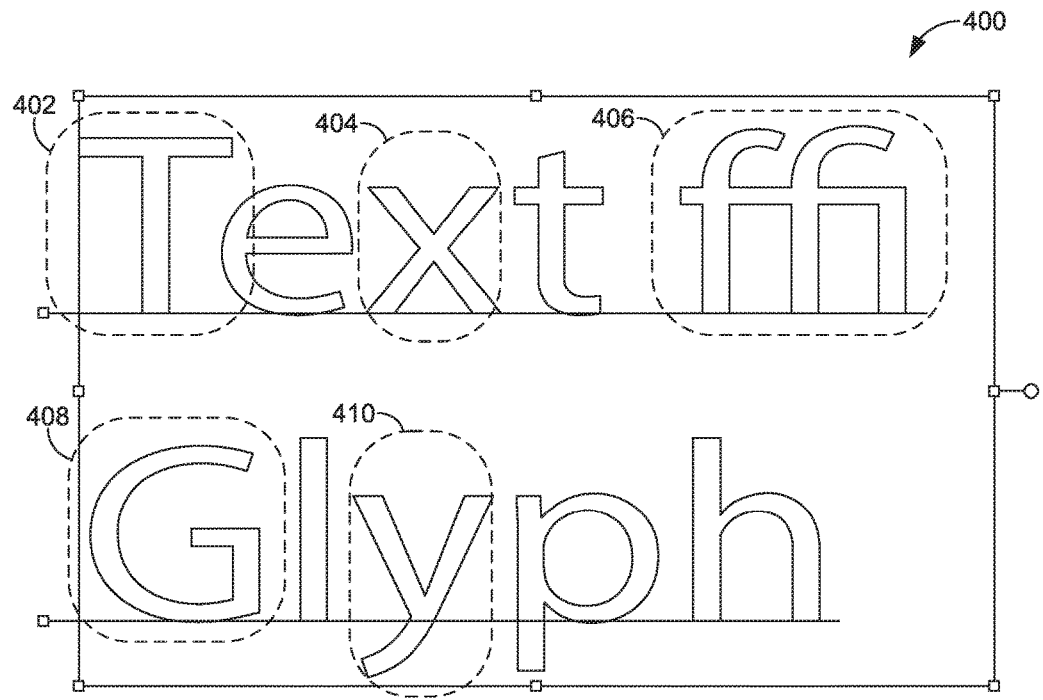
FIG. 4 illustrates a text segment that includes multiple glyphs, in accordance with some implementations of the present disclosure.

As mentioned, the target text may include an entire segment of text, a single character within a text segment, or any other portion of text, such as a glyph or combination of glyphs. By way of background, a "glyph" is a graphical element that represents one or more characters within a segment of text. FIG. 4 illustrates a text box 400 including a text segment that is comprised of multiple glyphs, such as glyphs 402, 404, 406, 408, and 410. In some instances, several characters may be represented by a single glyph, as is demonstrated by glyph 406. A glyph is associated with a particular font. For example, the character "A" is displayed using one glyph for Times New Roman font and another glyph for Calibri font. Accordingly, a font may be considered to be a collection of glyphs. The target determining module 110 may determine that the target text consists of an entire segment of text (e.g., all of the text included in text box 400), a single glyph associated with the text segment (which may include one or more characters), multiple glyphs associated with the text segment, or any other portion of text. Based on determining that the snapping functionality is to be enabled with respect to target text, the target determining module 110 provides an indication of the target text to the path extraction module 112 at step 804.

Figure 9:
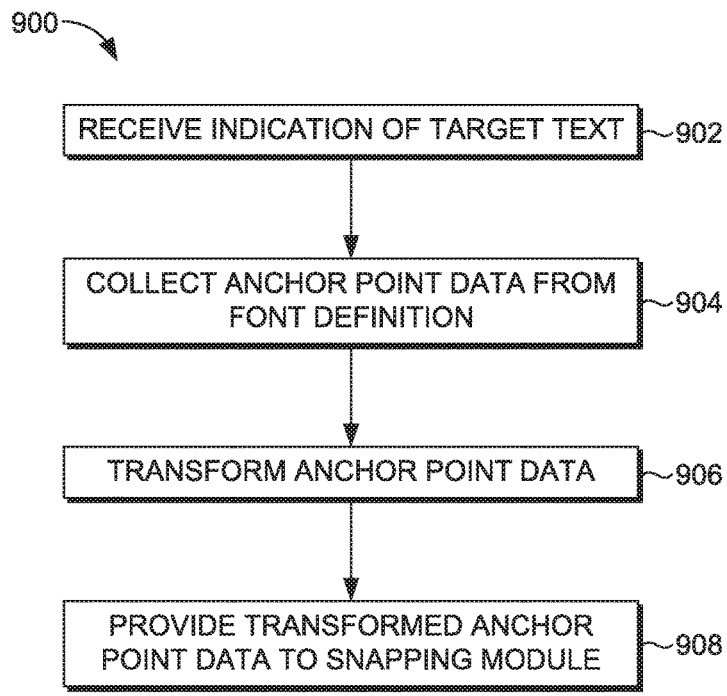
FIG. 9 is a flow diagram showing a method for determining path information for target text, in accordance with some implementations of the present disclosure.

The functionality provided by the path extraction module 112 is discussed with reference to FIG. 9, which includes an exemplary flow diagram 900. At step 902, the path extraction module 112 receives an indication of the target text for which snapping functionality is to be enabled. The path extraction module 112 utilizes font definitions, which may be available via font engine 118, for the target text in order to determine the relevant path information. Fonts generally fall into one of several categories, including outline fonts (sometimes called vector fonts) and bitmap fonts. The font definitions for outline fonts include vector outline information (which is comprised of anchor points) for each glyph in the font. By contrast, bitmap font definitions consist of a set of pixels representing an image of a glyph and do not include vector outline information. Thus, the path extraction module 112 utilizes font definitions for outline fonts to determine path information.

Each glyph in an outline font is defined internally in the form of a vector outline that includes anchor points. For example, the vector outlines for TrueType fonts are stored in the form quadratic Bezier curves; the vector outlines for CFF fonts are stored in the form of cubic Bezier curves; and the vector outlines for some other fonts are stored in the form of Scalable Vector Graphics ("SVG"), which use XML to describe two-dimensional graphics. OpenType fonts can contain a TrueType, CFF, or SVG representation of an outline. Most well-known fonts, such as Courier New and Myriad Pro, are OpenType fonts.

The font engine 118 may be an existing module within an operating system or a particular graphics application, or it may be a new module. Generally, the font engine 118 is responsible for processing font files. When an application requests a particular glyph in an outline font, the font engine 118 accesses vector outline information for that particular glyph and utilizes that information to render a glyph image that is suitable for display at a user interface. Thus, the vector outline information for various glyphs is available via the font engine 118, but is not usually made visible to users.

At step 904, the path extraction module 112 references the font definition in order to collect the anchor points associated with each glyph included in the relevant segment of text. Referencing the font definition may include retrieving information from the font engine 118.

The anchor points that are retrieved may be defined in terms of a coordinate system that is specific to an individual glyph, or that has a frame of reference corresponding to the glyph. In this instance, the glyph-centric anchor point data are converted to a set of coordinates that reflects the location of individual anchor points with respect to the overall environment in which the relevant glyph appears (e.g., a position within a document in a graphics application), or that has a frame of reference corresponding to the overall environment. For example, the glyph-centric anchor-point data may be defined with respect to the glyph and utilize a coordinate system having (0, 0) at the center of the glyph, and the transformed data may be defined with respect to a graphics application document on which the glyph appears and utilize a coordinate system having (0, 0) at the center of the graphics application document. The transformed data may account for both the location or position of the glyph with respect to its overall environment, as well as the orientation of the glyph (e.g., angle of rotation, whether it has been converted to a mirror image, and other possible configurations). In an example, the conversion between coordinate systems is accomplished by applying a transformation matrix to the path information included in the font definition. Accordingly, at step 906, the path extraction module 112 transforms the anchor point data that was collected from the font definition, and at step 908, the transformed anchor point data is provided to the snapping module 114. The term "anchor points" is used herein to refer to the points that define the path for an art object, but this terminology is not intended to be limiting. It is understood that other types of points or other types of data may be used to define a path and may be used to provide the snapping functionality described herein.

Figure 10:
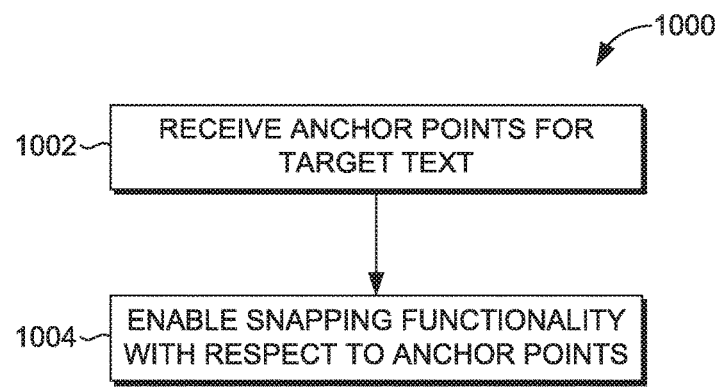
FIG. 10 is a flow diagram showing a method for enabling snapping functionality with respect to target text, in accordance with some implementations of the present disclosure.

The functionality provided by the snapping module 114 is discussed with reference to FIG. 10, which includes an exemplary flow diagram 1000. Certain vector applications, such as Adobe Illustrator®, may include a preexisting snapping module that facilitates snapping content to known paths. Thus, in some instances, the snapping module 114 corresponds to a preexisting snapping module that is enhanced to provide the functionality described herein. In other instances, the snapping module 114 corresponds to a new module. In either instance, the snapping module 114 facilitates the snapping of content to a path. Accordingly, at step 1002, the snapping module 114 receives anchor points for the target text. These anchor points may correspond to the transformed anchor point data provided by the path extraction module 112. At step 1004, the snapping module 114 enables snapping functionality with respect to the anchor points for the target text. As used herein "snapping" refers to precisely aligning an object with a particular path. For example, "snapping" occurs when an anchor point on an object (e.g., an "object point") is coupled to an anchor point associated with the target text. Upon such snapping, the object may be locked to the target text, such that as the object or the target text is manipulated, the anchor point on the object remains coupled to the anchor point associated with the target text.

Figure 11:
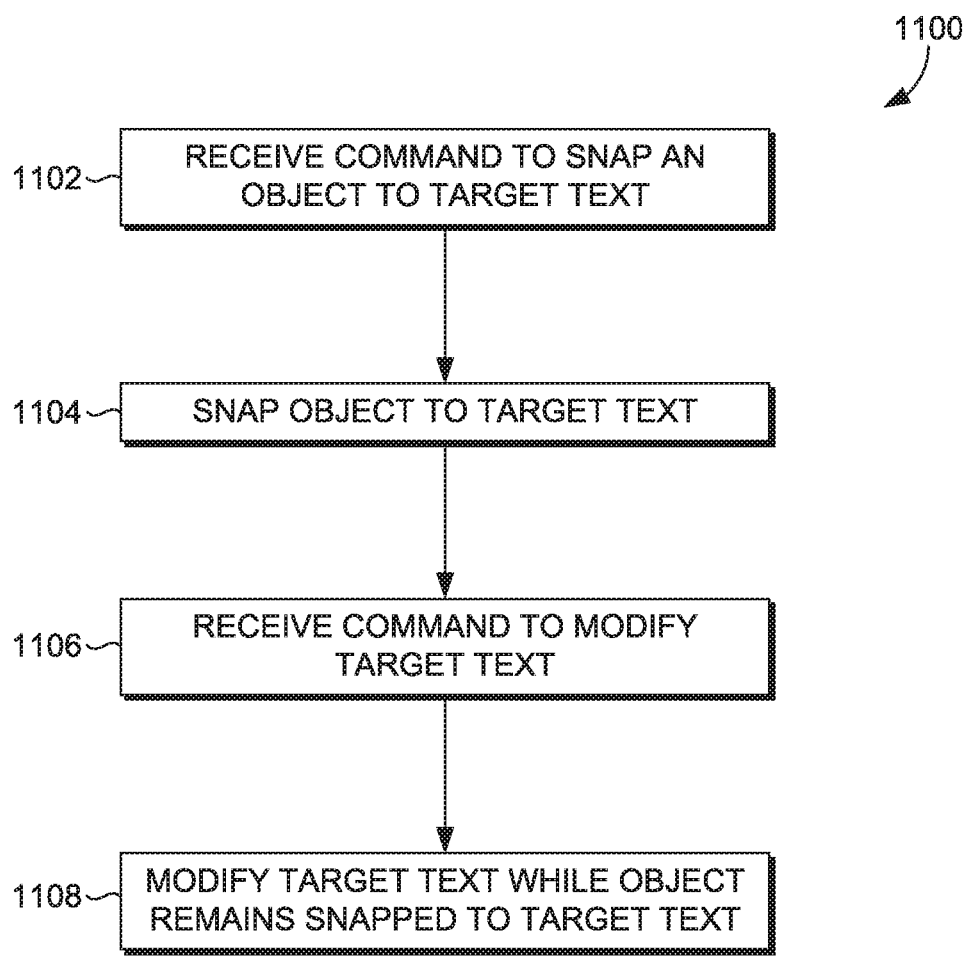
FIG. 11 is a flow diagram showing a method for snapping an object to target text, in accordance with some implementations of the present disclosure.

The functionality provided by the content generation module 116 is discussed with reference to FIG. 11, which includes an exemplary flow diagram 1100. At step 1102, a user input indicating a command to snap an object to the target text is received at the content generation module 116. For example, the user input may indicate that the object is to be coupled to a particular anchor point associated with the target text. The object may be a new object that is generated based on user input, such as input received via a drawing tool (e.g., cursor, pencil tool, pen tool, paintbrush tool, rectangle tool), or an existing object. In response to the user input, at step 1104, the object is snapped to the target text. Subsequently, at step 1106, a user input indicating a command to modify the target text is received. In response, at step 1108, the target text is modified. Potential modifications to the target text include replacing an existing character included in the target text with a new character, changing a font style associated with the target text, or any number of other modifications. The object remains coupled to the target text during and after the modification of the target text. This modification is possible because the target text was not converted to an outline in order to provide the snapping functionality. Instead, the target text retains the true semantics of text art and remains editable as text.

The snapping functionality discussed above may be implemented according to at least two exemplary methods, each of which is discussed below. According to the first exemplary method, anchor point information is determined for all glyphs included in a particular segment of text, an item of text art, or a document in a graphics application. According to the second exemplary method, anchor point information is determined "on demand" for a particular glyph that is indicated by user.

First Exemplary Method

The following exemplary algorithms correspond to the first method, in which anchor point information for all glyphs in a text segment is determined. As used in these algorithms, the term "hit art" refers to the art object over which a drawing tool is hovering. The first algorithm is a top-level algorithm, which adds anchor points to the snapping module 114. The top-level algorithm calls to the GetGlyphsAnchorPoint algorithm, which receives text art as an input and returns as an output a list of the anchor points for all glyphs in the text art.

Top-Level Algorithm:
1. Start Algorithm
2. Hit Art=Get the current hit art
3. If the Hit Art is a text art, do the following:
a. snapPointList=GetGlyphsAnchorPoint(Hit Art)
4. Add snapPointList in the Snapping Module
5. End of the Algorithm.
GetGlyphsAnchorPoint:
1. Start Algorithm
2. snapPointList=empty
3. for each line (L) in the text art
a. for each glyph(G) in the line (L)
  i. anchorPoints=Get Anchor Point of Glyph (G) from the font
  ii. Apply transformation to the anchorPoints
  //Transformation is applied so as to get the anchor point position
  //depending on the current glyph position
  iii. snapPointList.add(anchorPoints)
4. snapPointList contains all the required anchorPoints
5. End of the Algorithm.

The alignment engine 108 may implement the above algorithms. In an example, the target determining module 110 performs the second step of the top-level algorithm and determines the target text for which snapping functionality is to be enabled, while the path extraction module 112 performs the third step of the top-level algorithm, as well as the corresponding steps in the GetGlyphsAnchorPoint algorithm. For example, as discussed above, the path extraction module 112 extracts anchor point data from the relevant font definition. The path extraction module 112 then applies a transformation to the glyph-centric coordinates in order to obtain coordinates that reflect the location of individual anchor points with respect to the overall environment in which the relevant glyph appears. This transformed anchor point data is loaded into a snap point list that is referenced by the snapping module 114 in the fourth step of the top-level algorithm.

The anchor points may be stored at data store 104 in a cache that is specific to every item of text art. This is advantageous, because the alignment engine 108 need not determine anchor points anew each time they are needed. In one example, when the text art is modified, the cache is invalidated such that anchor points are determined anew the next time that they are needed. This is helpful, because after the text has been modified, the anchor point information is obsolete. For example, if a lowercase "e" is changed to an uppercase "E," or if an "a" is changed to a "b," the corresponding anchor points will be different. Invalidation may be triggered based on any modification to an item of text art (e.g., if any glyph in an item of text art is modified, the cache associated with the entire item of text art is invalidated) and/or based on a modification of a particular glyph (e.g., if a glyph in an item of text art is modified, the cache associated with that particular glyph is invalidated, but the cache associated with the remaining glyphs in the text art remains valid). Other invalidation logic may also be implemented.

Figure 5A:
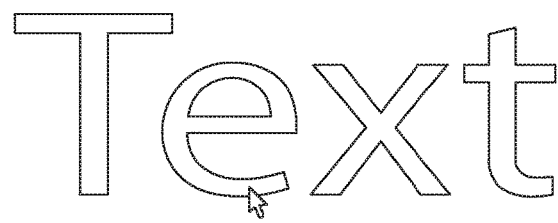
FIGS. 5A-D illustrate a series of exemplary screenshots in which an object is snapped to text, in accordance with some implementations of the present disclosure.
Figure 5B:
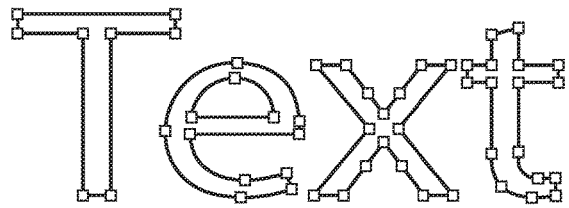

FIGS. 5A-D include an exemplary series of screenshots in which an object is snapped to text according to the first exemplary method. In FIG. 5A, a user utilizes a drawing tool (e.g., a cursor) to hover over an item of text art. Based on this hovering, or on another user input, the item of text art consisting of the word "Text" is identified as the target text for which snapping functionality is to be enabled. Accordingly, the path information for the glyphs associated with the word "Text" is determined. This may include collecting anchor point data from the font definition associated with the glyphs and transforming that data, as discussed above. A list of anchor points is then provided to the snapping module 114. In FIG. 5B, visual representations of the anchor points are provided for display (e.g., at a user interface of a graphics application) and made visible to the user. In some instances, visual representations of the anchor points are not provided for display. For example, an anchor point may be visible only when a user utilizes a drawing tool to hover over a portion of a glyph that is associated with the anchor point. Such hovering may cause a visual representation of the associated anchor point to be provided for display.

Figure 5C:
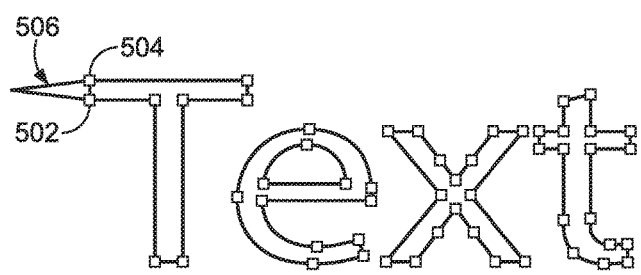

In FIG. 5C, user-generated content 506 is snapped to the glyph that represents the letter "T" via the anchor points 502 and 504. For example, anchor points on the user-generated content 506 are coupled to anchor points 502 and 504. Because this snapping functionality is enabled without converting the text to an outline, the text remains editable as text. Accordingly, in FIG. 6D, the text has been edited to include capital letters "E," "X," and "T." The user-generated content 506 remains snapped to anchor points 502 and 504.

Second Exemplary Method

As mentioned, according to the second exemplary method, anchor point information is determined "on demand" for a particular glyph that is indicated by user. This is advantageous if text art includes many glyphs and it is unnecessary to collect anchor point information for all of the glyphs in order to facilitate the snapping functionality desired by a user. Collecting the anchor point information for only a single glyph or a subset of glyphs within text art utilizes less compute and memory resources and yield better performance, as compared to collecting the anchor point information for all glyphs within text art. For example, collecting anchor point information for text art may include retrieving the information from the font engine 118, which requires time and processing power. Thus, if an item of text art includes 100 glyphs, then fetching path information for all 100 glyphs is resource intensive, but fetching path information for a subset of those glyphs is more manageable.

The intent of a user to snap an object to a particular glyph or glyphs may be ascertained in a number of ways. For example, if a user utilizes a drawing tool to hover over a particular glyph for a threshold amount of time (e.g., 1 second, 2 seconds, 3 seconds, 4 seconds, 5 seconds), then it is inferred that the user desires to snap an object to that particular glyph. Accordingly, anchor point information is collected for that particular glyph by the path extraction module 112 and provided to the snapping module 114. The threshold amount of time may be a user-defined parameter or may be a default parameter. In another example, a user may select a menu command indicating that snapping functionality is to be enabled for a certain glyph or glyphs.

The following exemplary algorithms correspond to the second method. The first algorithm is a top-level algorithm, which adds anchor points for the appropriate glyph to the snapping module 114, based on an inferred user intent. The top-level algorithm calls to the NeedSnapping and GetGlyphAnchorPoint algorithms.

The NeedSnapping algorithm determines whether snapping functionality is needed with respect to a particular glyph (e.g., infers whether the user intends to enable snapping functionality with respect to that glyph) based on an amount of time that a drawing tool has hovered over the same glyph. The parameter Tolerance(T) is the time (e.g., in seconds) for which a tool must hover over a particular glyph in order for snapping functionality to be enabled with respect to that glyph. As mentioned, this parameter may be user-defined and/or provided by default. The NeedSnapping algorithm returns a true or false value depending on whether snapping is needed.

The GetGlyphAnchorPoint receives as input an indication of the target text art and the glyph number associated with the glyph for which snapping functionality is needed. Each glyph within an item of text art or within an overall document in a graphics application may be associated with a glyph number. For example, each of the glyphs in FIG. 4 may be associated with different glyph numbers. The GetGlyphAnchorPoint algorithm returns a list of anchor points for the indicated glyph ("Nth glyph") in the target text.

Top-Level Algorithm:
Global Parameters:
last_hit_art=text art object which is last hit
start_time=time when the hovering (hit) started at the last hit art
last_hit_glyph=glyph no. over which tool is hovering in previous call
1. Start Algorithm
2. If NeedSnapping( )
 a. snapPointList=GetGlyphAnchorPoint(last_hit_art, last_hit_glyph)
3. Add snapPointList in the Snapping Module
4. End of the Algorithm.

NeedSnapping:
1. Start Algorithm
2. needSnapping=false;
3. current_art=Get the current hit text art,
4. current_time=Get current time
5. If current_art=last_hit_art
 a. current_glyph=Get current hit glyph number
 b. If current_glyph=last_hit_glyph
  i. If current time−start_time>=Tolerance(T)
   1. needSnapping=true
 c. else//Reset global parameter
  i. last_hit_glyph=current_glyph
  ii. start_time=current time
6. Else//Reset global parameter
 a. last_hit_art=current_art
 b. start_time=current time
 c. last_hit_glyph=0
7. return needSnapping.
8. End of the Algorithm
GetGlyphAnchorPoint:
1. Start Algorithm
2. G=Nth Glyph in the text art
3. anchorPoints=Get Anchor Point of Glyph (G) from the font
4. Apply transformation into the anchorPoints
//Transformation is applied so as to get the anchor point position
//depending on the current glyph position
5. return anchorPoints
6. End of the Algorithm.

The alignment engine 108 may implement the above algorithms. In an example, the target determining module 110 implements the NeedSnapping algorithm and provides information relevant to the last_hit_art and last_hit_glyph parameters, while the path extraction module 112 implements the GetGlyphAnchorPoint algorithm. For example, as discussed above, the path extraction module 112 extracts anchor point data from the relevant font definition. The path extraction module 112 then applies a transformation to the glyph-centric coordinates in order to obtain coordinates that reflect the location of individual anchor points with respect to the overall environment in which the relevant glyph appears. This transformed anchor point data is loaded into a snap point list that is referenced by the snapping module 114 in the third step of the top-level algorithm.

The anchor points may be stored at data store 104 in a cache that is specific to every item of text art. In an example, the anchor points are stored with reference to glyph number and an identification of the text art. This is advantageous, because the alignment engine 108 need not determine anchor points anew each time they are needed. In one example, when a glyph is modified, the cache is invalidated such that anchor points are determined anew the next time that they are needed. As explained above, this is helpful, because as after the glyph has been modified, the anchor point information is obsolete. Invalidation may be triggered based on any modification to an item of text art (e.g., if any glyph in an item of text art is modified, the cache associated with the entire item of text art is invalidated) and/or based on a modification of a particular glyph (e.g., if a glyph in an item of text art is modified, the cache associated with that particular glyph is invalidated, but the cache associated with the remaining glyphs in the text art remains valid). Other invalidation logic may also be implemented.

Figure 6A:
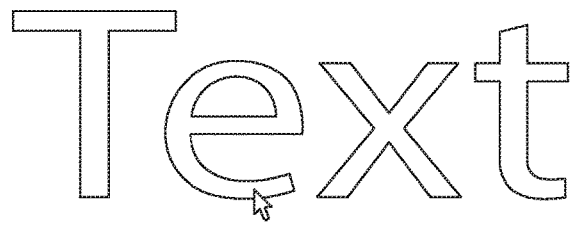
FIGS. 6A-D illustrate a series of exemplary screenshots in which an object is snapped to text, in accordance with some implementations of the present disclosure.
Figure 6B:
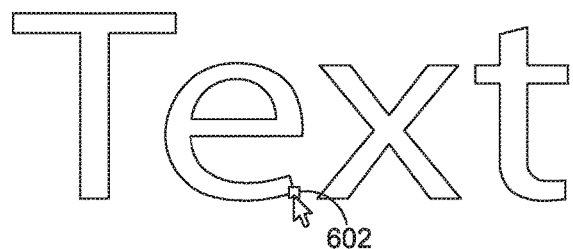
Figure 6C:
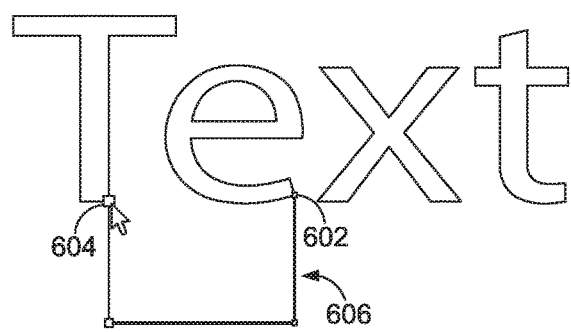
Figure 6D:
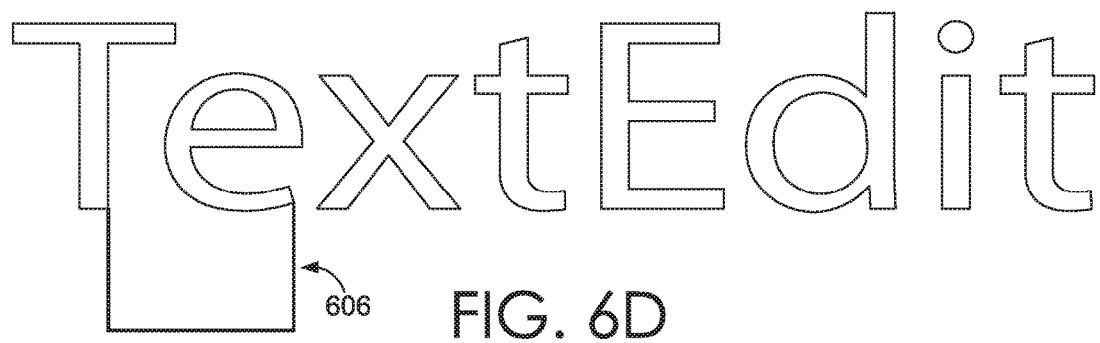

FIGS. 6A-D include an exemplary series of screenshots in which an object is snapped to text according to the second exemplary method. In FIG. 6A, a user utilizes a drawing tool (e.g., a cursor) to hover over an item of text art. In particular, the cursor hovers over the glyph that represents the letter "e." If the hovering time exceeds a predefined threshold, it is inferred that the user intends to snap an object to that particular glyph. Accordingly, the path information for that glyph is determined. This path information may be determined automatically, or without user intervention, in response to the hover time exceeding the predefined threshold. Determining the path information may include collecting anchor point data from the font definition associated with the glyph and transforming that data, as discussed above. A list of anchor points is provided to the snapping module 114. In FIG. 6B, an anchor point 602 on the selected glyph is made visible to the user. In one example, visual representations of all anchor points associated with a selected glyph are provided for display (e.g., at a user interface of a graphics application), and in another example, visual representations of a subset of the anchor points are provided for display. In FIG. 6B, for example, only the anchor point 602 associated with the location of the user's cursor is displayed. The anchor point 602 is magnified to facilitate the user employing the anchor point 602 to snap content to the associated text. In FIG. 6C, user-generated content 606 is snapped to the anchor point 602 on the glyph that represents the letter "e." Also in FIG. 6C, the user's cursor is hovering over the glyph that represents the letter "T." Based on this user input, the path information for that glyph has been determined and provided to the snapping module 114. Accordingly, the anchor point 604 associated with the location of the user's cursor is displayed and made available for snapping. Anchor point 604 is magnified to facilitate the user employing the anchor point 604 to snap content to the associated text. In FIG. 6C, the user-generated content 606 is snapped to the anchor point 604 on the glyph that represents the letter "T." For example, an anchor point on the user-generated content 606 is coupled to the anchor point 604. Because this snapping functionality is enabled without converting the text to an outline, the text remains editable as text. Accordingly, in FIG. 6D, the text has been edited to read, "TextEdit." The user-generated content 606 remains snapped to the anchor points 602 and 604 associated with the letters "T" and "e," respectively, during and subsequent to the text editing operation.

In the preceding examples discussed with respect to FIGS. 5A-D and 6A-D, the object snapped to the text was new content created by a user. It will be understood, however, that the object could be content previously created by a user (e.g., an existing object in a graphics application workspace), predefined content provided by a graphics application, or any other type of content. Accordingly, the object that is snapped to text may be drawn in association with the relevant anchor points, such that it is snapped to the text as soon as it is created, or it may be drawn separately from the relevant anchor points and later re-positioned in order to be snapped to the text.

Figure 5D:
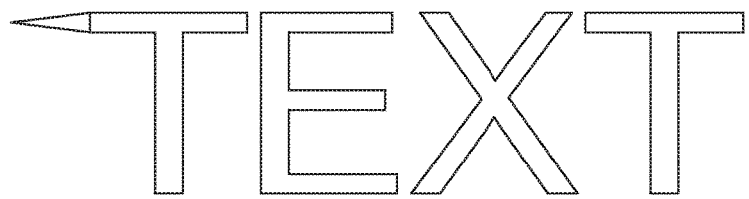

In some instances, the glyph to which an object has been snapped is edited. In one example, this causes the object to dissociate from the glyph. Thus, if the "T" in FIG. 5D is changed to a "t," then the user-generated content 506 remains visible in the graphics application, but it is no longer snapped to the glyph "t" (e.g., the user-generated content 506 is floating in space in the relevant graphics application). In another example, in response to editing the glyph to which an object has been snapped, the object remains snapped to the revised glyph. In order to enable this functionality, anchor points associated with common variations of a glyph are mapped to one another. For example, the anchor points for the crossbar on the uppercase "T" may be mapped to the anchor points for the crossbar on the lowercase "t," such that when the "T" is changed to a "t," the user-generated content 506 remains snapped to the crossbar. Common variations of a glyph include uppercase and lowercase letters, as in the preceding example, as well as different font styles.

Exemplary Operating Environment

Figure 12:
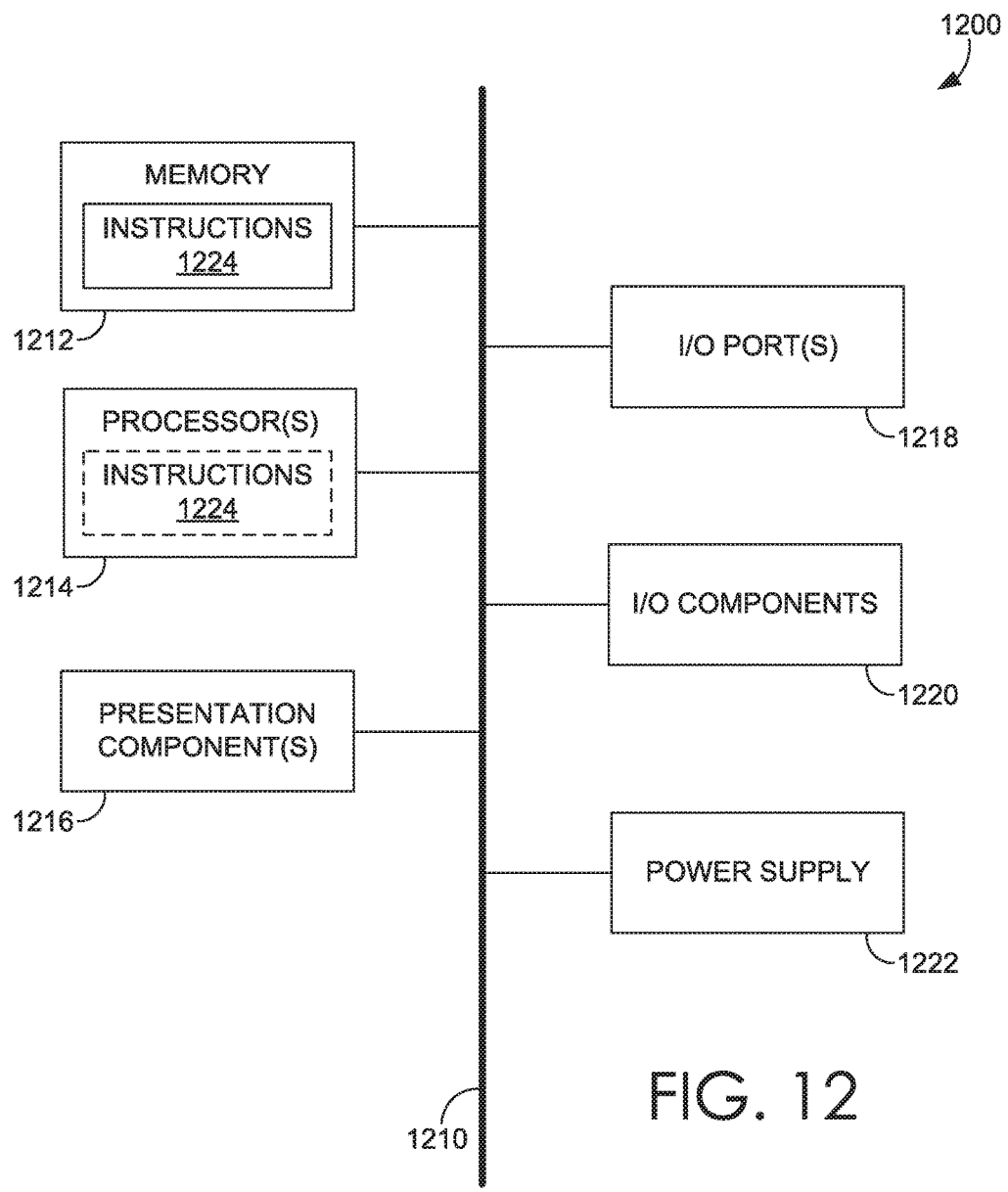
FIG. 12 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring to FIG. 12, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

Embodiments hereof may be described in the general context of computer code or machine-useable instructions, including computer-executable instructions such as program modules, being executed by a computer or other machine, such as a smartphone, personal data assistant, or other handheld device. Generally, program modules, or engines, including routines, programs, objects, components, data structures, etc., refer to code that perform particular tasks or implement particular abstract data types. Embodiments hereof may be practiced in a variety of system configurations, including hand-held devices, consumer electronics, general-purpose computers, more specialty computing devices, etc. Embodiments hereof may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output ports 1218, input/output components 1220, and an illustrative power supply 1222. Bus 1210 represents what may be one or more busses (such as an address bus, data bus, or combination thereof). Although the various blocks of FIG. 12 are shown with clearly delineated lines for the sake of clarity, in reality, delineating various components is not so clear, and metaphorically, the lines would more accurately be grey and fuzzy. For example, one may consider a presentation component such as a display device to be an I/O component, as well. Also, processors have memory. The inventors recognize that such is the nature of the art, and reiterate that the diagram of FIG. 12 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. As depicted, memory 1212 includes instructions 1224. Instructions 1224, when executed by processor(s) 1214 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and inherent to the systems and methods.

It will be understood that certain features and subcombinations are of utility and may be employed without reference to other features or subcombinations. This is contemplated by and is within the scope of the claims.

In the preceding Detailed Description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B or C" means "(A), (B), (C), (A and B), (A and C), (B and C), or (A, B and C)."

What is claimed is:

1. A computer system comprising:
one or more processors; and
one or more computer storage media storing computer-executable instructions that, when executed by the one or more processors, are configured to implement a method comprising:
based on a first user input indicating a glyph in a text segment that comprises text art, determining the glyph is a target glyph for a snapping operation, the target glyph comprising a graphical element representing a first character within the text segment,
retrieving path information for the target glyph from a font definition associated with the target glyph, the path information comprising a first set of coordinates that is associated with one or more points on a vector outline of the target glyph, the first set of coordinates defined with respect to the target glyph,
transforming the first set of coordinates into a second set of coordinates, the second set of coordinates defined with respect to a document in which the target glyph appears,
in response to a second user input indicating a point of the one or more points, coupling an object to the point, and
subsequent to coupling the object to the point, in response to a third user input indicating a command to modify the text segment, modifying the text segment as text art, wherein the object remains coupled to the point subsequent to the modification of the text segment.

2. The computer system of claim 1, wherein the first user input comprises hovering over the glyph in the text segment for an amount of time that exceeds a predefined threshold.

3. The computer system of claim 1, further comprising providing for display a visual representation of the second set of coordinates.

4. The computer system of claim 3, wherein modifying the text segment comprises at least one of replacing a second character included in the text segment with a new character or changing a font style of the second character included in the text segment.

5. The computer system of claim 4, wherein coupling the object to the point comprises coupling an object point associated with the object to the point.

6. The computer system of claim 1, wherein the path information is determined for all glyphs included in the text segment and is stored in a cache.

7. The computer system of claim 6, wherein at least a portion of the cache is invalidated in response to the modification of the text segment.

8. The computer system of claim 1, wherein the path information is determined only for the target glyph.

9. One or more computer storage media storing computer-useable instructions that, when executed by a computing device, cause the computing device to perform operations, the operations comprising:
retrieving, from a font definition, path information for a glyph included in a text segment, the path information comprising a first set of coordinates that is associated with one or more points on the glyph, the first set of coordinates having a first frame of reference corresponding to the glyph;
transforming the first set of coordinates into a second set of coordinates, the second set of coordinates having a second frame of reference corresponding to a document in which the glyph appears;
in response to a first user input indicating an object and the glyph, snapping the object to the glyph; and
in response to a second user input indicating a command to modify the text segment, modifying the text segment as text, wherein the object remains snapped to the glyph subsequent to the modification of the text segment.

10. The computer storage media of claim 9, wherein the operations further comprise:
receiving a third user input indicating the glyph included in the text segment;
based on the third user input, inferring a user intent to enable snapping functionality for the glyph; and
based on the inferred user intent, determining the glyph is a target glyph for a snapping operation.

11. The computer storage media of claim 10, wherein the third user input comprises hovering over the glyph in the text segment for a hover time that exceeds a predefined threshold.

12. The computer storage media of claim 11, wherein the path information is determined automatically in response to the hover time exceeding the predefined threshold.

13. The computer storage media of claim 9, further comprising providing for display a visual representation of the second set of coordinates.

14. The computer storage media of claim 9, wherein modifying the text segment comprises at least one of changing an existing character included in the text segment to a new character or changing a font style associated with the text segment.

15. The computer storage media of claim 14, wherein snapping the object to the glyph comprises coupling an object point associated with the object to a point of the one or more points included in the path information for the glyph.

16. The computer storage media of claim 14, wherein the path information is determined for all glyphs included in the text segment and is stored in a cache.

17. The computer storage media of claim 16, wherein a portion of the cache that is associated with a portion of the text segment that is changed by the modification is invalidated in response to the modification of the text segment.

18. A computer system comprising:
means for determining a glyph included in a text segment is a target glyph for a snapping operation;
means for retrieving path information for the target glyph from a font definition associated with the target glyph, the path information comprising one or more points;
means for transforming the path information from a first set of coordinates that is defined with respect to the target glyph to a second set of coordinates that is defined with respect to a document in which the target glyph appears;
means for aligning an object with the target glyph based on the second set of coordinates; and
means for modifying the text segment as text subsequent to aligning the object with the target glyph.

19. The computer system of claim 18, wherein determining the glyph included in the text segment is the target glyph comprises inferring a user intent to enable snapping functionality for the target glyph, wherein the user intent is inferred based on a user input.

20. The computer system of claim 18, wherein aligning the object with the target glyph comprises coupling an object point of the object to a point of the one or more points included in the path information for the target glyph.

* * * * *